(12) United States Patent
Wilkinson

(10) Patent No.: US 11,507,386 B2
(45) Date of Patent: Nov. 22, 2022

(54) BOOTING TILES OF PROCESSING UNITS

(71) Applicant: Graphcore Limited, Bristol (GB)

(72) Inventor: Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 309 days.

(21) Appl. No.: 16/527,562

(22) Filed: Jul. 31, 2019

(65) Prior Publication Data

US 2020/0319893 A1 Oct. 8, 2020

(30) Foreign Application Priority Data

Apr. 2, 2019 (GB) .................................... 1904629

(51) Int. Cl.
*G06F 9/44* (2018.01)
*G06F 9/4401* (2018.01)
(52) U.S. Cl.
CPC .................. *G06F 9/4403* (2013.01)
(58) Field of Classification Search
CPC .................................................. G06F 9/4403
See application file for complete search history.

(56) References Cited

U.S. PATENT DOCUMENTS

| 7,065,688 | B1 | 6/2006 | Moyes |
| 2002/0138156 | A1* | 9/2002 | Wong .................. G06F 15/16 700/8 |
| 2009/0240979 | A1 | 9/2009 | Campini |
| 2010/0174810 | A1 | 7/2010 | Cain |
| 2013/0013910 | A1* | 1/2013 | Temporelli ............ G06F 9/4416 713/2 |

OTHER PUBLICATIONS

Search Report dated Apr. 20, 2020 for United Kingdom Patent Application No. GB 1904629.1.

* cited by examiner

*Primary Examiner* — Stefan Stoynov
(74) *Attorney, Agent, or Firm* — Haynes and Boone, LLP

(57) ABSTRACT

A processing system comprises a first subsystem comprising at least one host processor and one or more storage units, and a second subsystem comprising at least one second processor. Each second processor comprises a plurality of tiles. Each tile comprises a processing unit and memory. At least one storage unit stores bootloader code for each of first and second subsets of the plurality of tiles of at least one second processor. The first subsystem writes bootloader code to each of the first subset of tiles of the at least one second processor. At least one of the first subset of tiles requests at least one of the storage units to return the bootloader code to the second subset of the plurality of tiles. Each tile to which the bootloader code is written retrieves boot code from the storage unit and then runs said boot code.

27 Claims, 3 Drawing Sheets

BOOTING TILES OF PROCESSING UNITS

CROSS-REFERENCE TO RELATED APPLICATIONS

The present application claims priority to United Kingdom Patent Application No. 1904629.1, filed Apr. 2, 2019, of which is hereby incorporated by reference in its entirety.

TECHNICAL FIELD

The present disclosure relates to operating a processing system, in particular, to the booting of tiles of a processor. Each tile has a respective processing unit and memory.

BACKGROUND

A multi-threaded processor is a processor which is capable of executing multiple program threads alongside one another. The processor may comprise some hardware that is common to the multiple different threads (e.g. a common instruction memory, data memory and/or execution unit); but to support the multi-threading, the processor also comprises some dedicated hardware specific to each thread.

The dedicated hardware comprises at least a respective context register file for each of the number of threads that can be executed at once. A "context", when talking about multi-threaded processors, refers to the program state of a respective one of the threads being executed alongside one another (e.g. program counter value, status and current operand values). The context register file refers to the respective collection of registers for representing this program state of the respective thread. Registers in a register file are distinct from general purpose memory in that register addresses are fixed as bits in instruction words, whereas memory addresses can be computed by executing instructions. The registers of a given context typically comprise a respective program counter for the respective thread, and a respective set of operand registers for temporarily holding the data acted upon and output by the respective thread during the computations performed by that thread. Each context may also have a respective status register for storing a status of the respective thread (e.g. whether it is paused or running). Thus each of the currently running threads has its own separate program counter, and optionally operand registers and status register(s).

One possible form of multi-threading is parallelism. That is, as well as multiple contexts, multiple execution pipelines are provided: i.e. a separate execution pipeline for each stream of instructions to be executed in parallel. However, this requires a great deal of duplication in terms of hardware.

Instead therefore, another form of multi-threaded processor employs concurrency rather than parallelism, whereby the threads share a common execution pipeline (or at least a common part of a pipeline) and different threads are interleaved through this same, shared execution pipeline. Performance of a multi-threaded processor may still be improved compared to no concurrency or parallelism, thanks to increased opportunities for hiding pipeline latency. Also, this approach does not require as much extra hardware dedicated to each thread as a fully parallel processor with multiple execution pipelines, and so does not incur so much extra silicon.

One form of parallelism can be achieved by means of a processor comprising an arrangement of multiple tiles on the same chip (i.e. same die), each tile comprising its own separate respective execution unit and memory (including program memory and data memory). Thus separate portions of program code can be run in parallel on different ones of the tiles. The tiles are connected together via an on-chip interconnect which enables the code run on the different tiles to communicate between tiles. In some cases the execution unit on each tile may itself run multiple concurrent threads on tile, each tile having its own respective set of contexts and corresponding pipeline as described above in order to support interleaving of multiple threads on the same tile through the same pipeline.

An example use of multi-threaded and/or multi-tiled processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for concurrency and/or parallelism.

SUMMARY

In a processing system, a processor may comprise one or more tiles, each of which comprises a respective processing unit and memory. Boot code must be run on each tile in order to boot that tile. The tiles are not preinstalled with the boot code and so must retrieve the boot code from a storage unit. The tiles retrieve the boot code by running a small portion of bootloader code (or a bootloader stub) on each tile, which then retrieves and launches the rest of the boot code from the storage device.

If the system comprises a plurality of tiles, the bootloader code must be written to each one of the tiles so that they are all booted. One option is for a host processor, or a host central processing unit (CPU), to write the bootloader code to each of the tiles. That is, the host CPU could separately write the bootloader code to each tile. However, this is a slow process since the host CPU cannot typically generate write requests fast enough to saturate the bandwidth of the link between the host CPU and the tiles. For example, the host CPU and processors may be linked by a peripheral component interconnect (PCI) interface.

According to a first aspect disclosed herein, there is provided a processing system comprising: a first subsystem comprising at least one host processor and one or more storage units; and a second subsystem comprising at least one second processor, wherein each second processor comprises a plurality of tiles, wherein each tile comprises a respective execution unit and memory; wherein at least one storage unit stores bootloader code for each of first and second subsets of the plurality of tiles of the at least one second processor, wherein the first subsystem is programmed to write bootloader code to each of the first subset of tiles of the at least one second processor, wherein the bootloader code for at least one of the first subset of tiles is configured to cause the at least one tile to request the at least one storage unit to return the bootloader code to the second subset of further tile of the at least one second processor, and wherein the bootloader code for each of the tiles is configured to cause each tile to which it is written to retrieve boot code from at least one of the storage units, and then run said boot code to boot that tile.

That is, the first subsystem (e.g. the host processor) can load a small piece of code (the bootloader code, or bootloader application) to a small number of tiles (e.g. just one tile). The bootloader code is configured to cause those few tiles (or just a single tile) that are loaded with the bootloader code to request the storage unit to return the bootloader code to other tiles. This makes use of a facility for tiles to request that responses to read requests that they issue to be directed to tiles other than themselves. In other words, instead of say, the host processor, having to write the bootloader code to each tile, the host processor now only has to write the bootloader to a select few tiles. This is particularly advantageous when the second processor comprises a large number of tiles.

In embodiments, the bootloader code stored for the first subset of tiles may be the same as the bootloader code stored for the second subset of tiles. Alternatively, the bootloader code stored for the first subset of tiles may differ compared to the bootloader code stored for the second subset of tiles.

In embodiments, the first subset of tiles of the at least one second processor may consist of a single tile. That is, the first subsystem only writes the bootloader code to a single tile. The bootloader code written to that one tile causes that tile to request the storage unit to return the bootloader code to the second subset of tiles.

In embodiments, the first subset of tiles of the at least one second processor may comprise multiple tiles, and wherein the bootloader code may be configured to cause each of the first subset of tiles to request the at least one of the storage units to return the bootloader code to the second subset of the plurality of further tiles of the at least one second processor.

In other words, the bootloader code causes the first subset of tiles (e.g. one or two tiles) to request the storage unit to return the bootloader code to all of the remaining tiles of the second processor.

In embodiments, the second subset of tiles of the at least one second processor may comprise multiple tiles.

In embodiments, the second subsystem may comprise a plurality of said second processors, and wherein the bootloader code may be configured to cause at least one of the first subset of tiles of one of the second processors to request the at least one storage unit to return the bootloader code to at least one tile of at least one other of the second processors.

That is, not only can the bootloader code cause the bootloader code to be returned to different tiles on the same second processor, the bootloader code may cause the bootloader code to be returned to tiles of a different second processor. In some embodiments, the bootloader code may cause the first subset of tiles of one second processor to request at least one of the storage units to return the bootloader code to at least one tile of every other second processor.

In embodiments, the bootloader code may be configured to cause at least one of the first subset of tiles of one of the second processors to request the at least one storage unit to return the bootloader code to each tile of at least one other of the second processors.

In embodiments, the at least one storage unit may be configured to, in response to receiving the request to return the bootloader code, return the bootloader code to each tile requested by the at least one of the first subset of tiles.

In embodiments, the at least one storage unit may be a network attached storage unit.

In embodiments, the system may comprise a peripheral component interconnect, PCI, or Ethernet interconnect, and wherein the first subsystem may be programmed to write the bootloader code to each of the first subset of tiles of the at least one second processor via said PCI or Ethernet interconnect.

In embodiments, the system may comprise the PCI, or Ethernet interconnect, and wherein the at least one tile may be configured to transmit said request to the at least one of the storage units via the PCI or Ethernet interconnect.

In embodiments, the system may comprise the PCI, or Ethernet interconnect, and wherein each tile to which the bootloader code is written may be configured to retrieve boot code from at least one of the storage units via the PCI or Ethernet interconnect.

In embodiments, the system may comprise an external interconnect, wherein the at least one tile is configured to issue the request with: (i) an address of the at least one of the storage units where the bootloader code is stored, (ii) a respective identifier of each of the second subset of tiles, (iii) a respective address of each of the second subset of tiles where the bootloader code is to be stored, wherein an interface of the external interconnect is configured to maintain a table comprising a respective tag mapped to the respective identifier of each of the second subset of tiles and the respective address of each of the second subset of tiles where the bootloader code is to be stored, and wherein external interconnect is configured to transmit the request to the at least one of the storage units with the respective tag and the address of the storage unit, wherein the at least one of the storage units is configured to return the bootloader code with the respective tag, and wherein the external interconnect is configured to use the respective tag to look-up the respective identifier of each of the second subset of tiles and the respective address of each of the second subset of tiles where the bootloader code is to be stored.

The interconnect (which may be dedicated hardware) may be an interconnect between tiles on a single second processor, and/or an interconnect between second processors. In some embodiments, the system may comprise an interconnect on each second processor, and an interconnect between each second processor.

In embodiments, each second processor may be an accelerator processor.

According to a second aspect disclosed herein, there is provided a method of operating a processing system, wherein the processing system comprises a first subsystem comprising at least one host processor and one or more storage units, and a second subsystem comprising at least one second processor, wherein each second processor comprises a plurality of tiles, wherein each tile comprises a respective execution unit and memory, wherein at least one storage unit stores bootloader code for each of first and second subsets of the plurality of tiles of the at least one second processor, and wherein the method comprises: the first subsystem writing bootloader code to each of the first subset of tiles of the at least one second processor; at least one of the first subset of tiles requesting the at least one of the storage units to return the bootloader code to the second subset of the plurality of further tiles of the at least one second processor; and each tile to which the bootloader code is written retrieving boot code from the storage unit and then running said boot code.

In embodiments, the first subset of tiles of the at least one second processor may comprise multiple tiles, and wherein the method may comprises: each of the first subset of tiles requesting the at least one of the storage units to return the bootloader code to the second subset of the plurality of further tiles of the at least one second processor.

In embodiments, the second subsystem may comprise a plurality of said second processors, and wherein the method may comprise: at least one of the first subset of tiles of one of the second processors requesting the at least one storage unit to return the bootloader code to at least one tile of at least one other of the second processors.

In embodiments, the method may comprise: at least one of the first subset of tiles of one of the second processors requesting the at least one storage unit to return the bootloader code to each tile of at least one other of the second processors.

In embodiments, the method may comprise: in response to receiving the request to return the bootloader code, the at least one storage unit returning the bootloader code to each tile requested by the at least one of the first subset of tiles.

In embodiments, the processing system may comprise a peripheral component interconnect, PCI, or Ethernet interconnect, and wherein the method may comprises: the first subsystem writing the bootloader code to each of the first subset of tiles of the at least one second processor via said PCI or Ethernet interconnect.

In embodiments, the system may comprise the PCI, or Ethernet interconnect, and wherein the method may comprise: the at least one tile transmitting said request the at least one of the storage units via the PCI or Ethernet interconnect.

In embodiments, the system may comprise the PCI, or Ethernet interconnect, and wherein the method may comprise: each tile to which the bootloader code is written retrieving boot code from at least one of the storage units via the PCI or Ethernet interconnect.

BRIEF DESCRIPTION OF THE DRAWINGS

To aid understanding of the present disclosure and to show how embodiments may be put into effect, reference is made by way of example to the accompanying drawings in which.

DETAILED DESCRIPTION

Figure 1:
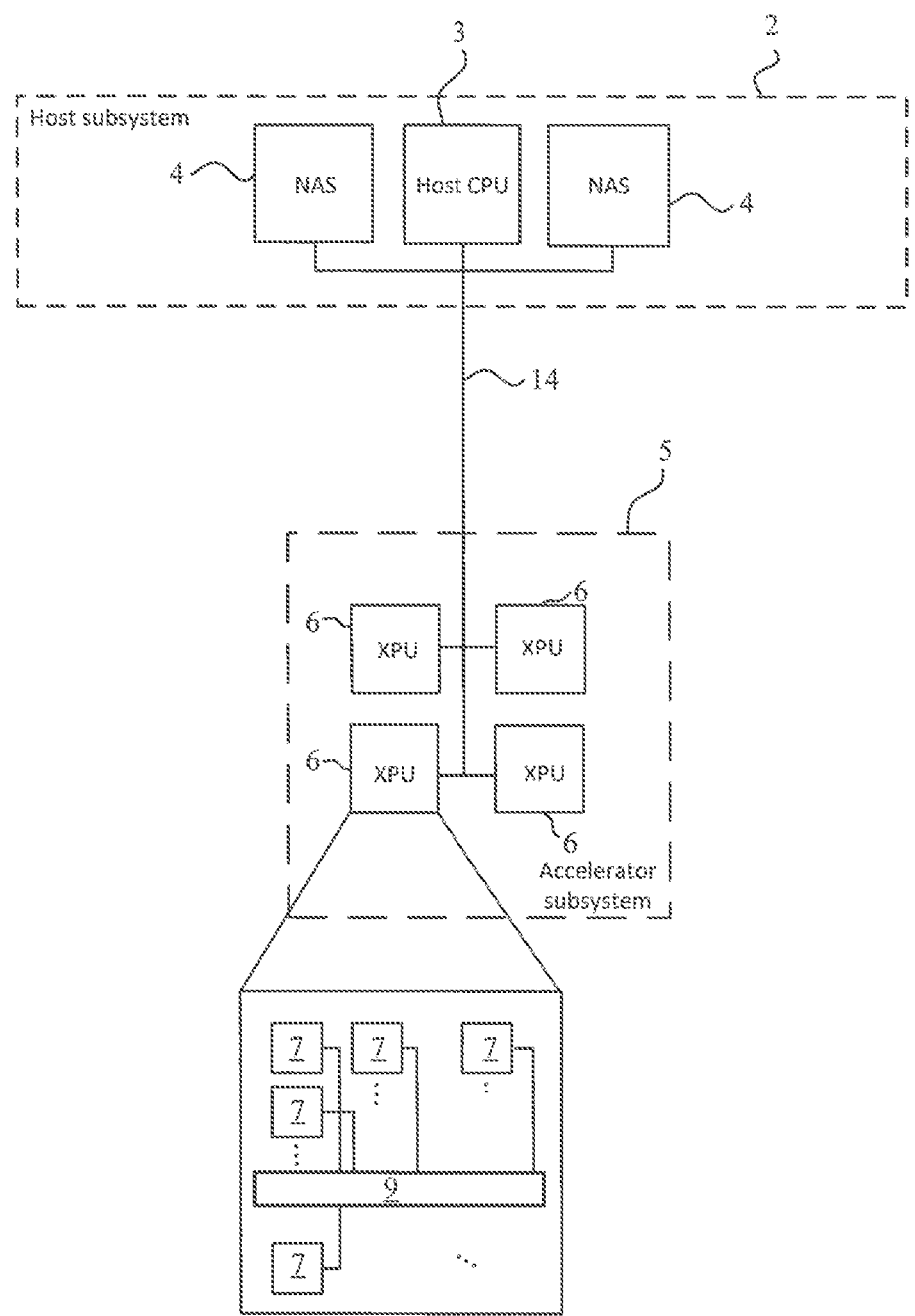
FIGS. 1 and 2 are illustrative examples of a schematic block diagram of a processing system having a first subsystem and a second subsystem according to embodiments.

Embodiments provide a method of operating a processing system. An example processing system is described below with reference to FIGS. 1 to 3.

The processing system 1 comprises first and second subsystems 2, 5. The first subsystem 2 comprises one or more host processors 3. The first subsystem 2 also comprises one or more storage units 4. One or more of the storage units 4 may be a network attached storage (NAS) unit. The second subsystem 5 comprises one or more "second" processors 6. Here, "second" is merely a label to distinguish over the host processors. Hereinafter, the second processors 6 will be referred to as accelerator processors 6, but embodiments apply equally to other second processors. Each accelerator processor 6 comprises a plurality of "tiles" 7. Each tile 7 comprises at least a respective processing unit 18 and memory 16.

At least one storage unit 4 stores bootloader code for first and second subsets of tiles 7 of a first accelerator processor 6. The at least one storage unit 4 may store bootloader code for each tile 7 of the first accelerator processor 6. That is, the first and second subsets may together make up all of the plurality of tiles of the first accelerator processor 6. In some embodiments, each storage unit 4 stores bootloader code for the first and second subsets of tiles 7 of the first accelerator processor 6. Moreover, one, some or all of storage units 4 may store bootloader code for one, some, or all of the tiles 7 of a second accelerator processor 6. In fact, one, some, or all of the storage units 4 may store bootloader code for one, some, or all of the tiles 7 of each accelerator processor 6 of the second subsystem 5.

In a first step, the first subsystem 2 is programmed to write bootloader code to each tile in the first subset of tiles 7 of the first accelerator processor 6. In the same first step, the first subsystem 2 may be programmed to write bootloader code to each tile in a first subset of tiles 7 of a second accelerator processor 6. In embodiments it is the host processor 3 of the first subsystem 2 which write the bootloader code to the first subset of tiles 7. The host processor 3 may write to the tiles 7 directly or via an intermediary such as, for example, a gateway processor. Gateway processors are described below in relation to FIG. 2. More generally however, any component of the first subsystem may issue the initial write of the bootloader code to the first subset of tiles 7. The first subsystem 2 may be connected to and communicate with the first and/or second subset of tiles 7 of the first accelerator processor 6 via an interconnect. The first subsystem 2 may write the bootloader code to the first subset of tiles 7 via the interconnect. The interconnect may be, for example, a peripheral component interconnect (PCI) or Ethernet interconnect. E.g. the PCI may be a conventional PCI, PCI-Extended (PCI-x), PCI Express (PCI-e), etc. Other suitable interconnect protocols may be used. In some examples, the first subsystem 2 may be connected to each accelerator processor 6 via the interconnect. The first and second subsystems may be connected by a first interconnect technology (e.g. PCI) whilst the accelerator processors of the second subsystem may be connected via a second, different interconnect technology (e.g. Ethernet). Alternatively, the first and second interconnect technologies may be the same (e.g. both PCI-e). The write of the bootloader code, the sending of the request and the retrieving of the boot code may be via the same or different interconnect technologies.

In a subsequent step, the bootloader code causes at least one of the first subset of tiles 7 of the first accelerator processor 6 to cause (or trigger) that tile to request at least one of the storage units 4 to return the bootloader code to the second subset of tiles 7. That is, one or more of the first subset of tiles 7 sends a request to one or more storage units 4 to return the bootloader code to one or more further tiles 7. Here, a further tile is a tile which the bootloader code has not yet been written. In other words, the first and second subsets of tiles 7 are exclusive, non-overlapping subsets. The one or more tiles 7 of the first subset send the request to at least one of the storage units 4 that stores bootloader code for the second subset of tiles 7.

In some examples, the first subset is a single tile, such that the first subsystem 2 writes the bootloader code to a single tile, and the bootloader code causes that single tile to request one or more storage units 4 to return the bootloader code to the second subset of tiles 7, which may comprise one, some or all of the remaining tiles 7 of the first accelerator processor 6.

Alternatively, the first subset of tiles 7 comprises more than one tile, and the bootloader code causes one, some, or all of those tiles 7 to send respective requests to one or more storage units 4 for the bootloader code to be returned to the second subset of tiles 7.

The tile(s) of the first accelerator processor 6 may be connected to and communicate with one, some or all of the storage units 4 via an interconnect. The tile(s) may therefore send the request to the storage unit(s) via the interconnect. The interconnect may be the same interconnect by which the first subsystem 2 is connected to the tile(s), e.g. the PCI or Ethernet connection.

The bootloader code is configured to cause a tile to which it is written to retrieve boot code from at least one of the storage units 4. That is, in response to receiving the bootloader code, each of the first subset of tiles 7 of the first accelerator processor 6 are configured to retrieve boot code from one or more storage units 4. Similarly, in response to receiving the bootloader code, each of the second subset of tiles 7 of the first accelerator processor 6 are configured to retrieve boot code from one or more storage units 4. The tile(s) may retrieve the boot code from the storage unit(s) via the interconnect, e.g. via the PCI or Ethernet connection.

The first subset of tiles 7 may retrieve the boot code from the storage units 4 before they request the storage unit(s) to return the bootloader code to the second subset. Alternatively, the tile(s) of the first subset may send the request to the storage unit(s) first, and then retrieve the boot code from the same or different storage unit(s). As another alternative, the tile(s) may, in the same step, send the request and retrieve the boot code.

In response to retrieving the boot code, each tile is configured to run that boot code, thus booting that tile. Therefore, some or all of the tiles 7 of the first accelerator processor 6 can be booted from just a small number of writes by the first subsystem 2, e.g. the host CPU. In the case where the first subset of tiles 7 is just one tile, some or all of the tiles 7 of the first processor can be booted stemming from the first subsystem 2 writing the bootloader code to only one tile.

In embodiments, the second subsystem 5 comprises a plurality of second processors (hereinafter a plurality of accelerator processor 6s). Instead of only booting the tiles 7 of the first accelerator processor 6, tiles 7 of one or more further accelerator processors 6 may be booted. For instance, the bootloader code may be configured to cause one or more tiles 7 of the first subset of tiles 7 of the first accelerator processor 6 to request one or more storage units 4 to return the bootloader code to one or more tiles 7 of at least one other accelerator processor 6, e.g. a second accelerator processor 6. In some examples, the storage unit(s) are requested to return the bootloader code to each tile on at least one other accelerator processor 6. In yet further examples, the storage unit(s) are requested to return the bootloader code to each tile on each accelerator processor 6. Since the bootloader code is configured to cause each tile to which it is written to retrieve boot code from the storage unit(s), in response to receiving the bootloader code, the tile(s) of the other accelerator processors then retrieve the boot code. Once they have retrieved the boot code, the tile(s) of the other accelerator processors run the boot code and are thus booted.

Therefore not only can multiple tiles 7 of a single accelerator processor 6 be booted from a small number of writes issued by the first subsystem 2, instead the tiles 7 of multiple accelerator processors can be booted from the same number of writes, e.g. from just a single write of the bootloader code issued by the host CPU.

As stated above, in response to receiving bootloader code, at least one tile of an accelerator requests at least one storage unit to return the bootloader code to one or more different tiles on the same accelerator. In some embodiments, the tile may be configured to issue the request (a read request) with a first address (S) in the storage unit which is to be returned to the accelerator. The first address (S) identifies where the bootloader code is stored in the storage unit. The read request is also issued with a second address (A) which is an address in a tile that the response (a read response) is to be directed to, i.e. an address in one of the different tiles. Furthermore, the read request is issued with an identifier (ID) of the tile the response is directed to, i.e. an identifier of one of the different tiles.

At the interconnect of the accelerator (e.g. the PCI interface), a tag (T) is generated and used as an index to a table where the second address (A) and tile identifier (ID) are stored. The accelerator to which the tile issuing the read request belongs maintains the table of tags, against each of which is stored the identifier (ID) of the tile and the address (A) within that tile that the response data is to be returned to. The request is then transmitted to the storage unit with the tag (T) and the first address (S), i.e. the storage address. The tag (T) and first address (S) may be in a packet header of the request. The storage unit retrieves the data from the first address (S), i.e. the data stored in the first address, and returns that data back to the accelerator, with the tag (T) in the packet header.

At the external interconnect of the accelerator (e.g. the PCI interface), the returning tag (T) is used to lookup the identifier (ID) of the destination tile, and the second address (A) of the destination tile. This therefore allows the read response to be sent over the interconnect between the accelerator's external interconnect and the many tile processors, to the correct tile. The tag (T) may then be discarded or re-used.

A tile may issue multiple reads to the storage, each with a respective second address and identifier, with the external interconnect of the accelerator (e.g. the PCI interface) capable of storing multiple such tag/Address/ID entries simultaneously. This allows the storage unit to return the read response (bootloader code) to multiple different tiles.

As stated above, in response to receiving bootloader code, at least one tile of a given accelerator may request at least one storage unit to return the bootloader code to one or more different tiles belonging to a different accelerator, as long as those two accelerators have a direct connection using a suitable external interconnect between them which could be PCI but could also be an alternative private external interconnect. In some embodiments, when issuing the read request to the storage unit, the tile may also issue the request with a processor identifier (P-ID). The processor identifier (P-ID) identifies a different accelerator that the read response is to be returned to via an interconnect between the (e.g. first and second) accelerators. The processor identifier (P-ID) is stored in the table at the interconnect of the accelerator (e.g. the PCI interface). The processor identifier (P-ID), indexed by the tag (T), is stored in the table along with the second address (A) and identifier (ID) of the tile of the corresponding accelerator.

Then, when a response with a given tag (T) is returned, the processor identifier (P-ID) is used to route the response to the correct accelerator over the direct inter processor interconnect link mentioned above. The identifier (ID) and address (S) of the tile are then used to direct the response to the correct tile on that accelerator.

A tile may issue multiple read requests, each with a respective processor identifier. This allows the storage unit to return the read response (bootloader code) to multiple different accelerators.

Alternatively, the storage unit may be configured to automatically return the bootloader code to any tile from which the read request was not received.

Figure 2:
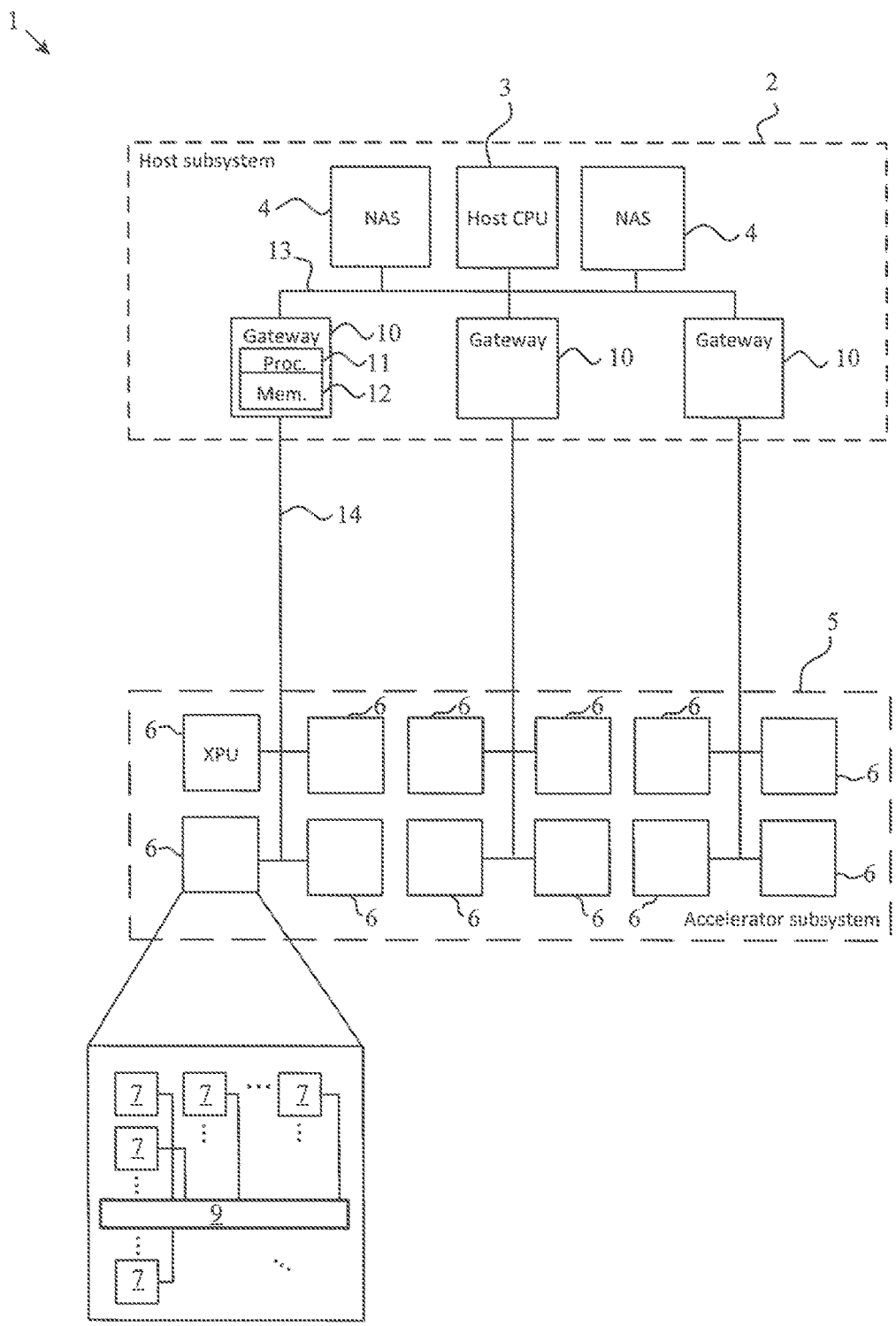

FIGS. 1 and 2 show example processing systems 1 in accordance with embodiments of the present disclosure. The processing system 1 comprises a first processing subsystem 2 comprising at least one host processor 3 and one or more storage units 4. The processing system further comprises a second processing subsystem 5 comprising one or more second processors 6. The first subsystem 2 may be a host subsystem and the second subsystem may be an accelerator subsystem. The host processor 3 may be a host central processing unit ("host CPU") configured with the role of a host, for allocating work; and each of the one or more second processors 5 may be an accelerator processor ("XPU"), i.e. a co-processor which is arranged to perform work allocated by the host processor 3. The host processor 3 may be privileged and the accelerator units 6 may undertake work delegated by the host processor 3. In embodiments each of the accelerator processors 6 may take the form of an IPU ("Intelligence Processing Unit") designed especially for use as a machine intelligence accelerator processor.

The second processors 6 may be connected together by an (inter-processor) interconnect. For instance each of the second processors 6 may be implemented on a separate chip (die) and the (inter-processor) interconnect may take the form of an external interconnect, i.e. inter-chip interface. The chips could be packaged on the same integrated circuit (IC) package, or different packages, or some on the same package and some on different packages. The interconnect also connects the second processors 6 to the host processor 3 via a suitable host interface such as a PCI, PCIe, PCIx or Ethernet interface. The interconnect comprises a network of data paths 14 for exchanging data between the second processors 6 and/or between a second processor 6 and the host processor 3. The same interconnect or a different interconnect may connect the second processors 6 and/or the host CPU 3 to the one or more storage units 4 (e.g. the NASs). Each second (accelerator) processor may be connected to one another, e.g. via the interconnect. This ensures that the tiles on each of the accelerator processor can be booted from one or some of the tiles of a different accelerator processor.

The host processor 3 may comprise a respective processing unit and memory (not shown in FIGS. 1 and 2). In embodiments, each of one, some or all of the second processors 6 may comprise a respective array of tiles 7. In embodiments the tiles 7 of a given second processor 6 are implemented on the same chip (die) as one another. Each tile 7 comprises a respective processing unit 8 (which may include a respective execution unit 15) and memory 16, examples of which are discussed in more detail later with reference to FIG. 3. In some embodiments the processing unit 8 on each of the tiles 7 is a multithreaded processing unit 8 for running multiple concurrent threads on the tile 7. The tiles 7 are connected together via an internal, inter-tile interconnect 9 which enables transfer of data between tiles 7.

In some examples, as shown in FIG. 2, the first subsystem 2 may comprise the host processor 3 and one or more gateway processors 10. Each of the gateway processors 10 also comprises a respective processing unit 11 and memory 12. The one or more gateways 10 are arranged as intermediaries between the host processor 3 and the second processors 6. Each gateway 10 is connected to one or more of the second processors 6 via the host interface and the inter-processor interconnect. E.g. each gateway 10 may be connected to a different respective set of the second processors 6 (consisting of one or more of the second processors 6) via a respective instance of the host interface and a different respective part of the inter-processor interconnect. Alternatively it is not excluded that a given second processor 6 could connect to the first subsystem 2 via multiple gateways 10. Either way, each of the gateways 10 is connected on the other side to the host CPU 3. This connection may for example be via a host network 13, e.g. a PCI, PCIe, PCIx or Ethernet network. One or more of the gateways 10 may also be connected to one or more of the storage units 4, e.g. network attached storage units (NASs), i.e. storage drives such as hard disks or flash drives. For example the NASs may also be connected on the host network 13. The first subsystem 2 may comprise one or more other components (e.g. other processors)—not shown The gateway(s) 10 may have any one or more of a number of roles. For instance, in embodiments, one or more of the gateways 10 are arranged to act as buffers for streams of data such as sequences of images, audio streams or other streams of experience data which are to be streamed to the second processors 6 in order for the second processors 6 to conduct machine learning based thereon; e.g. to train a neural network to identify objects, faces, sounds, or other structures in the received experience data. The use of the gateway 10 in this way may be desirable since it relieves the resources of the host CPU. Instead, at least some of the data destined for the second processors 6 is buffered in the respective memory 12 of the gateway(s) 10 in question. In some cases the gateway(s) 10 may be arranged to retrieve some or all of the streams directly from one or more of the storage units 4, e.g. via the host network 13, rather than the data having to go through the host memory host CPU 3.

Alternatively or additionally, in embodiments one or more of the gateways 10 may be arranged to pre-process the data (e.g. streams of experience data) prior to supply to the second processors 6. For instance this pre-processing may comprise decoding, decrypting and/or conditioning the data. E.g. in the latter case, the conditioning may comprise adding deliberate pseudorandom noise to the experience data. This is known to help improve the ability of a machine learning algorithm (in this case run on the accelerators 2) to form generalizations from the experience data rather than just memorize the experience data. Offloading such pre-processing to the gateway(s) 10 advantageously relieves the host CPU 3 from such tasks.

Each entity of system (e.g. the host processor(s), storage unit(s), accelerator processor(s) and/or tile(s) of an accelerator processor) may, when communicating with another entity of the system (e.g. the same or different type of entity), send a descriptor of their intended interactions with the other entity. The entity receiving the descriptor can then prepare accordingly, such as to prepare its memory. For instance this may comprise reserving a suitable portion of memory, or ensuring the required data is generated and stored in memory in the case of a transfer from one entity to another. The descriptor may be sent via the interconnect, e.g. via the data paths 14. Alternatively it is not excluded that the descriptor could be sent by another, side channel (not shown). The descriptor specifies a value for each of a set of one or more parameters describing the intended interaction(s). The interaction may comprise a transfer of data between a memory of one entity (e.g. the host processor 3) and the memory of another tile (e.g. the memory 16 of one of the tiles 7). For each interaction, the parameters specified may for example comprise any of: I) a direction of the transfer; II) a size (amount) of the data to be transferred e.g. in bytes; and/or III) an identifier of the item of content to which the data being transferred belongs.

Figure 3:
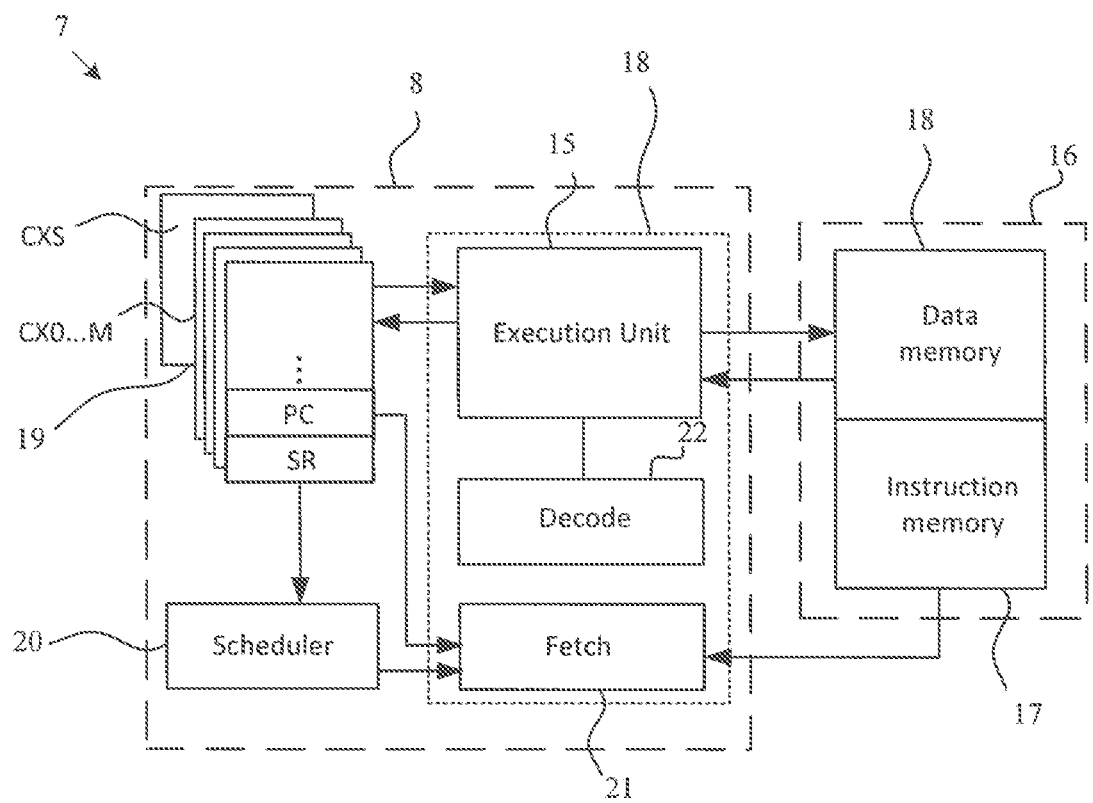
FIG. 3 is an illustrative example of a schematic block diagram of a multi-threaded processor.

FIG. 3 illustrates an example of a processor tile 7 in accordance with embodiments of the present disclosure. For instance the processor tile 7 may be one tile of an array of like processor tiles on a same chip, or may be implemented as a stand-alone processor on its own chip. The processor tile 7 may comprise a multi-threaded processing unit 8 in the form of a barrel-threaded processing unit, and a local memory 16 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 16 comprises an instruction memory 17 and a data memory 23 (which may be implemented in different addressable memory unit or different regions of the same addressable memory unit). The instruction memory 17 stores machine code to be executed by the processing unit 8, whilst the data memory 23 stores both data to be operated on by the executed code and data output by the executed code (e.g. as a result of such operations).

The memory 16 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

The program described herein comprises a plurality of worker threads, and a supervisor subprogram which may be structured as one or more supervisor threads. These will be discussed in more detail shortly. In embodiments, each of some or all of the worker threads takes the form of a respective "codelet". A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. N.B. some literature also defines a codelet as being stateless, i.e. if run twice it could not inherit any information from its first run, but that additional definition is not adopted here. Note also that not all of the worker threads need be codelets (atomic), and in embodiments some or all of the workers may instead be able to communicate with one another.

Within the processing unit 8, multiple different ones of the threads from the instruction memory 16 can be interleaved through a single execution pipeline 18 (though typically only a subset of the total threads stored in the instruction memory can be interleaved at any given point in the overall program). The multi-threaded processing unit 8 comprises: a plurality of context register files 19 each arranged to represent the state (context) of a different respective one of the threads to be executed concurrently; a shared execution pipeline 18 that is common to the concurrently executed threads; and a scheduler 20 for scheduling the concurrent threads for execution through the shared pipeline in an interleaved manner, preferably in a round robin manner. The processing unit 8 is connected to a shared instruction memory 17 common to the plurality of threads, and a shared data memory 23 that is again common to the plurality of threads.

The execution pipeline 18 comprises a fetch stage 21, a decode stage 22, and an execution stage 15 comprising an execution unit which may perform arithmetic and logical operations, address calculations, load and store operations, and other operations, as defined by the instruction set architecture. Each of the context register files 19 comprises a respective set of registers for representing the program state of a respective thread.

The skilled person is familiar with multi-threaded processing per se and therefore it will not be described in detail here. Furthermore, FIGS. 1 to 3 are included for illustrative purposes and should not be construed as limiting.

In embodiments, the boot code may be stored in a NAS or storage device separate from the host CPU. Various embodiments avoid the host CPU having to write a bootloader stub individually to each tile or IPU, which is a slow process because the host can't generate the writes fast enough to saturate the PCI. Embodiments allow for a bootloader stub on one tile to send a read request to a NAS and have it return the result to another tile (including, in some cases, to a tile on another IPU). The bootloader stub is loaded onto the other tiles. The tiles can then retrieve the boot code directly from the NAS without involving the host. The boot code is then run to boot the tiles. Therefore the host CPU does not need to write the bootloader stub onto each tile individually, other than to write the bootloader stub to the first tile, or a first subset of the tiles.

Other applications and variants of the disclosed techniques may become apparent to a person skilled in the art once given the disclosure herein. The scope of the present disclosure is not limited by the described embodiments but only by the accompanying claims.

The invention claimed is:

1. A processing system comprising:
    a first subsystem comprising at least one host processor and one or more storage units; and
    a second subsystem comprising at least one second processor comprising a plurality of tiles, wherein each second processor comprises two or more of the plurality of tiles, wherein each tile comprises a respective processing unit and memory,
    wherein at least one storage unit stores first bootloader code for each of a first subset of the plurality of tiles and second bootloader code for each of a second subset of the plurality of tiles,
    wherein the first subsystem is programmed to write the first bootloader code to each of the first subset of tiles of the at least one second processor,
    wherein the first bootloader code for at least one of the first subset of tiles is configured to cause the at least one of the first subset of tiles to send one or more read requests, via an interconnect between the first and second subsystems, requesting the at least one storage unit to return the second bootloader code to the second subset of tiles of the at least one second processor, the one or more read requests identifying each of the second subset of tiles to which the second bootloader code is to be returned, wherein the at least one storage unit is configured to, in response to the one or more read requests, return one or more read responses comprising information enabling identification of each of the second subset of tiles; and wherein the first and second bootloader codes are each configured to cause each tile to which they are written to retrieve boot code from at least one of the storage units via the interconnect, and then run said boot code to boot that tile.

2. The system according to claim 1, wherein the first subset of tiles of the at least one second processor consists of a single tile.

3. The system according to claim 1, wherein the first subset of tiles of the at least one second processor comprises multiple tiles, and wherein the first bootloader code is configured to cause each of the first subset of tiles to request the at least one of the storage units to return the second bootloader code to the second subset of the plurality of tiles of the at least one second processor.

4. The system according to claim 1, wherein the second subset of tiles of the at least one second processor comprises multiple tiles.

5. The system according to claim 1, wherein the at least one storage unit is configured to, in response to receiving the one or more read requests to return the second bootloader code, return the second bootloader code to each tile requested by the at least one of the first subset of tiles.

6. The system according to claim 1, wherein the at least one storage unit is a network attached storage unit.

7. The system according to claim 1, wherein the interconnect comprises a peripheral component interconnect, PCI, or Ethernet interconnect, and wherein the first subsystem is programmed to write the first bootloader code to each of the first subset of tiles of the at least one second processor via said PCI or Ethernet interconnect.

8. The system according to claim 1, wherein the interconnect comprises a PCI, or Ethernet interconnect, and wherein the at least one of the first subset of tiles is configured to transmit said one or more read requests to the at least one of the storage units via the PCI or Ethernet interconnect, and/or wherein the boot code is retrieved from the at least one of the storage units via the PCI or Ethernet interconnect.

9. The system according to claim 8, wherein the interconnect is an external interconnect, wherein the at least one tile is configured to issue each of the one or more read requests with: (i) an address of the at least one of the storage units where the second bootloader code is stored, (ii) a respective identifier of each of the second subset of tiles, (iii) a respective address of each of the second subset of tiles where the second bootloader code is to be stored, wherein an interface of the external interconnect is configured to maintain a table comprising a respective tag mapped to the respective identifier of each of the second subset of tiles and the respective address of each of the second subset of tiles where the second bootloader code is to be stored, and wherein the external interconnect is configured to transmit the one or more read request to the at least one of the storage units with the respective tag and the address of the storage unit, wherein the at least one of the storage units is configured to return the second bootloader code in the one or more read responses with the respective tag, and wherein the external interconnect is configured to use the respective tag to look-up the respective identifier of each of the second subset of tiles and the respective address of each of the second subset of tiles where the second bootloader code is to be stored.

10. The system according to claim 1, wherein each tile to which the first bootloader code is written is configured to retrieve boot code from at least one of the storage units via a peripheral component interconnect (PCI) or an Ethernet interconnect.

11. The system according to claim 1, wherein each second processor is an accelerator processor.

12. The processing system as claimed in claim 1, wherein the first bootloader code and the second bootloader code are a same bootloader code.

13. The processing system as claimed in claim 1, wherein the first bootloader code and the second bootloader code are different.

14. A method of operating a processing system, wherein the processing system comprises a first subsystem comprising a host processor and a storage unit, and a second subsystem comprising a second processor, wherein the second processor comprises a plurality of tiles, wherein each tile comprises a respective processing unit and memory, wherein the storage unit stores first bootloader code for a first tile of the plurality of tiles and second bootloader code for a second tile of the plurality of tiles, and wherein the method comprises:

the first subsystem writing first bootloader code to the first tile;

the first bootloader code causing the first tile to send one or more read requests requesting the storage unit to return second bootloader code to the second tile, the one or more read requests identifying the second tile;

the storage unit, in response to the one or more read requests, returning one or more read responses comprising information enabling identification of the second tile;

the first bootloader code causing the first tile to retrieve boot code from the storage unit and then run said boot code; and the second bootloader code causing the second tile to retrieve boot code from the storage unit and then run said boot code.

15. The method according to claim 14, wherein requesting the storage unit to return the second bootloader code comprises:

executing the first bootloader code on the first tile, thereby causing the first tile to perform the requesting.

16. The method according to claim 14, wherein the storage unit comprises a network attached storage unit.

17. The method according to claim 14, wherein requesting the storage unit to return the second bootloader code comprises:

sending the one or more read requests to the storage unit from the first tile via a peripheral component interconnect, PCI, or Ethernet interconnect.

18. The method according to claim 14, further comprising:

receiving the second bootloader code at the second tile from the storage unit via a peripheral component interconnect, PCI, or Ethernet interconnect.

19. The method according to claim 14, wherein the second processor comprises an accelerator processor.

20. A non-transitory machine readable medium having stored thereon instructions for performing a method of operating a processing system, the medium comprising machine executable code which when executed by at least one machine, causes the machine to:
receive first bootloader code at an accelerator subsystem from a storage unit of a host subsystem, wherein the accelerator subsystem includes a processor having a plurality of tiles, and wherein the first bootloader code is received at a first tile of the plurality of tiles;
issue, in response to the first bootloader code being executed by the first tile, one or more read requests to request the storage unit to return second bootloader code to a second tile of the plurality of tiles, the one or more read requests identifying the second tile;
execute the first bootloader code and the second bootloader code, thereby causing the first tile and the second tile to retrieve boot code from the storage unit; and
run the boot code at the first tile and the second tile.

21. A method implemented in a first processing device comprising a first plurality of tiles wherein each of the tiles comprises a processing unit and memory, wherein the first processing device is configured to interface with a first subsystem comprising a storage unit, the method comprising:
receiving a first request from a first tile of the first plurality of the tiles, wherein the first request is a request for data to be returned to a second tile of a second plurality of tiles belonging to a second processing device, and wherein the first request comprises an identifier of the second tile;
in response to receiving the first request, sending a read request for the data to the first subsystem, wherein the read request comprises a tag mapped to the identifier of the second tile;
receiving a response to the read request from the first subsystem, the response comprising the data and the tag;
looking up the identifier of the second tile based on the tag; and
sending the data to the second tile based on the identifier determined from the look up.

22. The method of claim 21, wherein the request comprises a destination address in memory of the second tile, wherein the tag is mapped to the destination address, the method further comprising:
sending the data to be stored at the destination address based on the tag.

23. The method of claim 21, wherein the request comprises a processing device identifier of the second processing device, wherein the tag is mapped to the processing device identifier, the method further comprising:
looking up the processing device identifier based on the tag in the response; and
sending the data to the second processing device based on the processing device identifier.

24. A processing system comprising:
a first subsystem comprising at least one host processor and one or more storage units; and
a second subsystem comprising a plurality of second processors, wherein each second processor comprises a plurality of tiles, wherein each tile comprises a respective processing unit and memory,
wherein at least one storage unit stores bootloader code for each of first and second subsets of the pluralities of tiles of the plurality of second processors,
wherein the first subsystem is programmed to write bootloader code to each of the first subset of tiles,
wherein the bootloader code for at least one of the first subset of tiles belonging to a first of the second processors is configured to cause the at least one of the first subset of tiles to send a request, via an interconnect between the first and second subsystems, requesting the at least one storage unit to return the bootloader code to each of the second subset of tiles, the second subset of tiles including at least one tile of a second of the second processors,
wherein the bootloader code for each of the tiles is configured to cause each tile to which it is written to retrieve boot code from at least one of the storage units via the interconnect, and then run said boot code to boot that tile.

25. The system according to claim 24, and wherein the bootloader code is configured to cause at least one of the first subset of tiles of one of the second processors to request the at least one storage unit to return the bootloader code to each tile of at least one other of the second processors.

26. A method of operating a processing system, wherein the processing system comprises a first subsystem comprising a host processor and a storage unit, and a second subsystem comprising a plurality of second processors, wherein each second processor comprises a plurality of tiles, wherein each tile comprises a respective processing unit and memory, wherein the storage unit stores bootloader code for each of a first tile and a second tile of the pluralities of tiles, wherein the first tile belongs to a first of the second processors and the second tile belongs to a second of the second processors, and wherein the method comprises:
the first subsystem writing bootloader code to the first tile;
the first tile requesting the storage unit to return the bootloader code to the second tile; and
the first tile and the second tile retrieving boot code from the storage unit and then running said boot code.

27. A non-transitory machine readable medium having stored thereon instructions for performing a method of operating a processing system, the medium comprising machine executable code which when executed by at least one machine, causes the machine to:
receive bootloader code at an accelerator subsystem from a storage unit of a host subsystem, wherein the accelerator subsystem includes a first processor having a first plurality of tiles, and wherein the bootloader code is received at a first tile of the first processor;
request, by the first tile, the storage unit to return the bootloader code to a second tile, the second tile belonging to a second processor of the accelerator subsystem, the second processor having a second plurality of tiles;
execute the bootloader code, thereby causing the first tile and the second tile to retrieve boot code from the storage unit; and
run the boot code at the first tile and the second tile.

* * * * *